Figure 1:
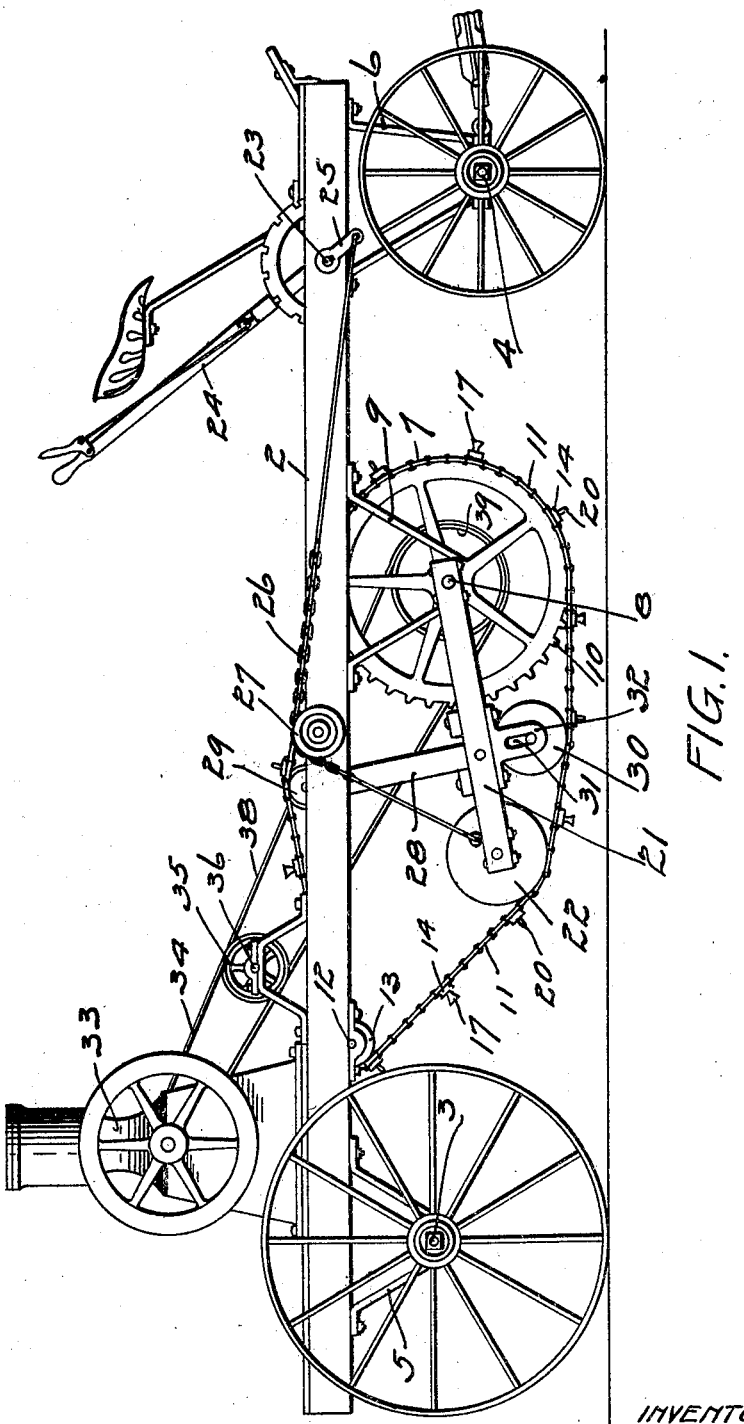

No. 794,318. PATENTED JULY 11, 1905.
M. SCHMITT.
WEED EXTERMINATOR.
APPLICATION FILED OCT. 1, 1904.

3 SHEETS—SHEET 1.

WITNESSES

INVENTOR
MATHIES SCHMITT
BY
HIS ATTORNEYS

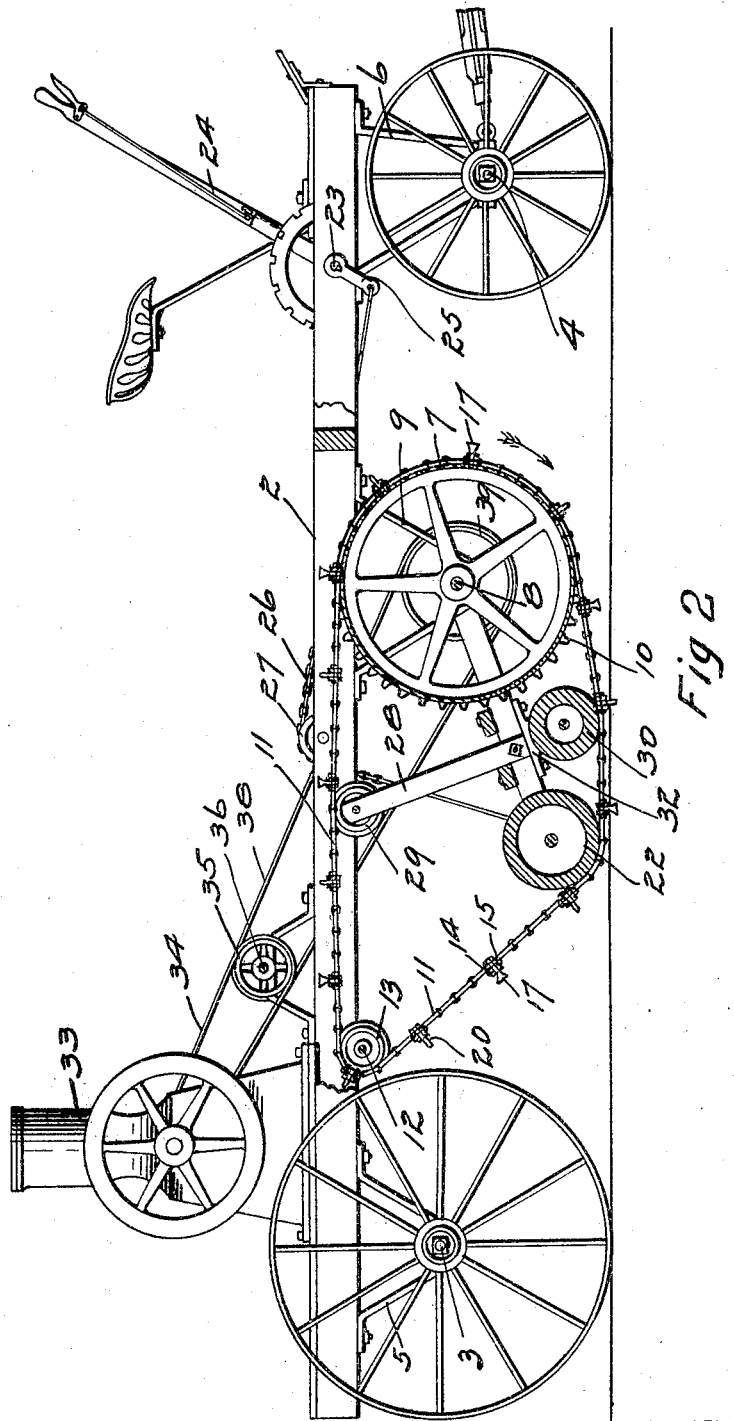

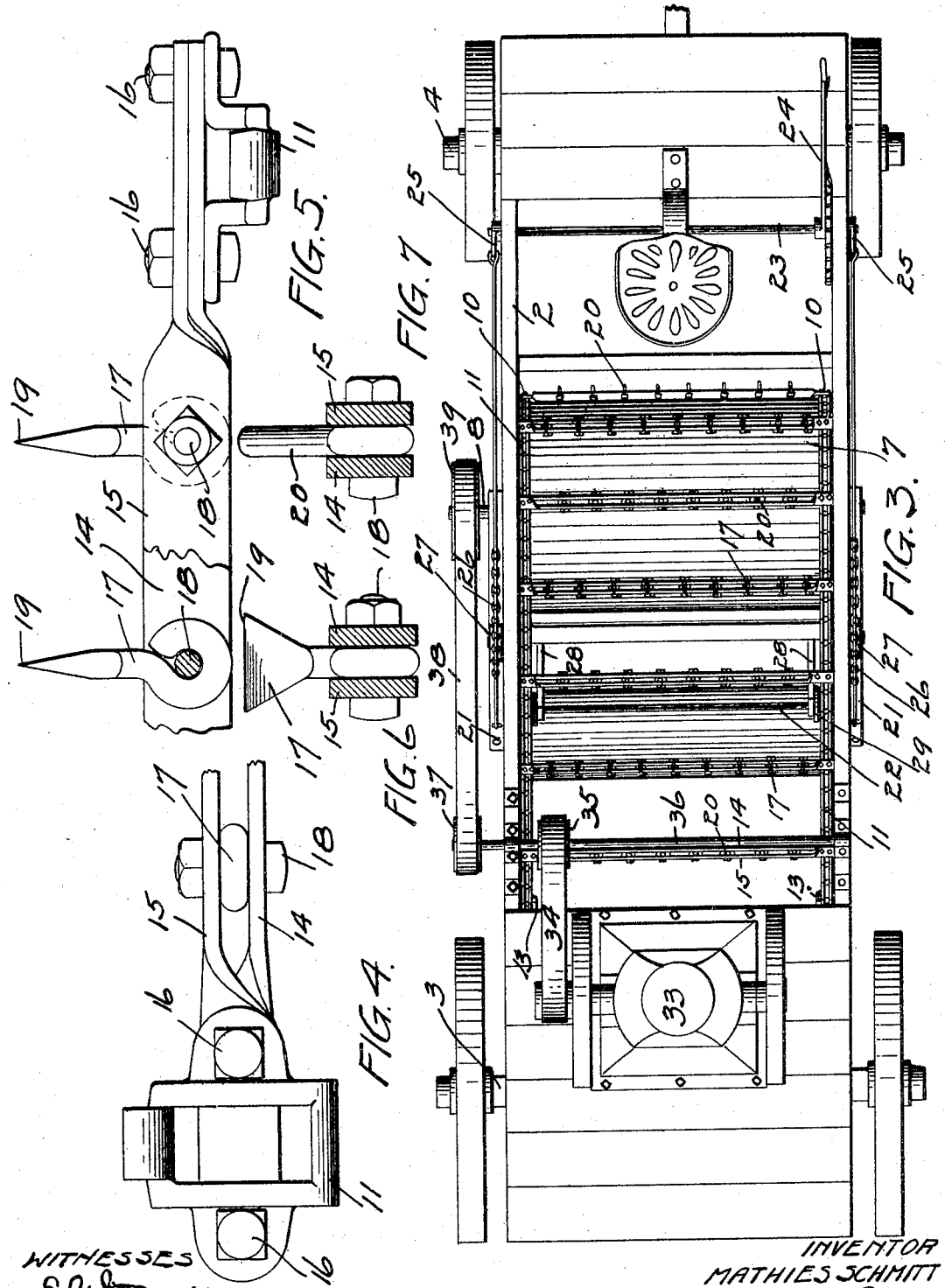

No. 794,318.      Patented July 11, 1905.

UNITED STATES PATENT OFFICE.

MATHIES SCHMITT, OF AUSTIN, MINNESOTA.

WEED-EXTERMINATOR.

SPECIFICATION forming part of Letters Patent No. 794,318, dated July 11, 1905.

Application filed October 1, 1904. Serial No. 226,740.

*To all whom it may concern:*

Be it known that I, MATHIES SCHMITT, of Austin, Mower county, Minnesota, have invented certain new and useful Improvements in Weed-Exterminators, of which the following is a specification.

My invention relates to agricultural implements; and the object of the invention is to provide a machine for destroying and exterminating noxious weeds in the soil, and particularly the type known as "quack-grass."

A further object is to provide an apparatus which will not only cut and destroy the weeds, but will pulverize the soil.

The invention consists generally in various constructions and combinations, all as hereinafter described, and particularly pointed out in the claims.

In the accompanying drawings, forming part of this specification, Figure 1 is a side elevation of a weed-exterminator embodying my invention. Fig. 2 is a longitudinal vertical section of the same. Fig. 3 is a plan view. Fig. 4 is a detail view showing the manner of securing the knife and teeth supporting bars on the sprocket-chains at the edges of the apron or belt. Fig. 5 is a detail view showing the manner of mounting the knives on the bars. Fig. 6 is a sectional view showing the shape of the knives. Fig. 7 is a similar view showing the shape of the pins or teeth that are mounted on the alternate bars.

In the drawings, 2 represents a suitable frame supported upon front and rear axles 3 and 4, having bars 5 and 6. A cylinder or drum 7 is mounted on a shaft 8, journaled in brackets 9, depending from the under side of the frame 2, near the forward end thereof. This drum or cylinder is provided at each end with sprocket-teeth 10, over which chains 11 pass. A shaft 12, mounted in bearings on the under side of the frame 2, has a roller 13 to support the rear portion of the sprocket-chains. The chains are connected at suitable intervals by bars 14 and 15, the ends of which are twisted, as indicated in Fig. 4, and secured by bolts 16 to the sprocket-chains. Between the bars 14 and 15 at proper intervals I provide knives 17, mounted on bolts 18. These knives have cutting edges 19, that are adapted to enter the soil and cut the roots of the weeds and quack-grass as the machine moves over the ground. The knives may be made of any suitable length and shape. I prefer, however, to make their cutting-blades of the form indicated in Fig. 6, wedge-shaped and tapering from their outer end toward their supports. The alternate bars are provided with pins or teeth 20, supported in a similar manner on the knives and alternating in position on the bars therewith, so that there will be a pin in the rear of the space between each pair of knives, and consequently when the knives engage the quack-grass and cut and tear the roots thereof the pins will follow along and engaging the roots pull them out of the soil and also tear up any weeds or grass that may have been missed by the knives.

To hold the apron down to its work, I prefer to provide a frame 21, pivoted on the shaft 8 and carrying a comparatively large roller 22, that bears upon the apron and forces the knives and teeth into the soil. To raise this roller and relieve the pressure on the apron or belt, I provide a shaft 23, operated by a lever 24 and having crank-arms 25, connected by chains 26 with the frame 21, the chains passing over idle wheels 27. By throwing the lever 24 forward the roller 22 will be released and with the frame will drop by gravity and resting upon the apron force the knives and teeth into the soil to their working position. To raise the apron at the same time the frame 21 is elevated, I provide arms 28, mounted on the frame 21 and having idle wheels 29 at their upper ends which engage the upper section of the apron and take up the slack therein when the pressure is relieved thereon by the elevation of the roller 22. (See Fig. 1.) As soon, however, as the lever is manipulated and the frame 21 released the roller 22 will drop to its depressed position and drag the apron down and force its teeth and knives into the soil. I prefer also to provide an idle roller 30, vertically mounted in slots 31 in bracket 32, that depends from the frame 21. This roller bears upon the apron between the roller 22 and the drum or cylinder and aids in holding the apron in its proper working position. Any suitable means may be provided for operating the apron; but I prefer to mount an engine 33 on the frame of the machine and connect it by a belt 34 with a pulley 35 on a shaft 36. A similar pulley 37 on said shaft is connected by a belt 38 with a pulley 39 on the cylinder-shaft 8. If preferred, this apparatus may be attached to the rear end of a wagon and drawn across a field, or the engine may be located on the wagon instead of on the frame. It is immaterial, however, whether the apron be driven from a source of power located on the machine itself or any other point, provided it is operated at the desired speed, which will usually be about six times as fast as the movement of the machine. I found this speed about right to produce the best results.

In operation the lever is thrown to the position indicated in Fig. 2 and the roller-supporting frame allowed to drop and press the knives and teeth into the soil. The weed-roots and grass will be cut and torn by these knives and teeth and dragged out of the soil, and as the belts leave the gravity-roller and travel at an incline up to the frame of the machine the grass, roots, and earth collected by the teeth will slide off and fall upon the ground. The teeth will also break up lumps and clods of earth and thoroughly pulverize the same and leave the ground free of weeds and noxious grasses and in fit condition for cultivation.

I claim as my invention—

1. The combination, with a wheeled frame, of a revolving member mounted thereon, a series of knives carried by said member and tapering from their outer toward their inner ends and of sufficient length to enter the soil and cut the roots of the grass therein, and a series of pins provided at intervals on said member each pin being in the rear of the space between a pair of knives and adapted to engage and pull out the roots cut by the knives, substantially as described.

2. The combination, with a wheeled frame, of an apron or belt supported thereon and provided with transverse rows of knives that are adapted to enter the soil, means for driving said apron or belt, and a gravity-roller arranged to bear upon said belt and force said knives into the soil.

3. The combination, with a wheeled frame, of an apron or belt supported thereon and provided with transverse rows of knives that are adapted to enter the soil and cut the roots of the grass, means for driving said apron or belt, a pivoted frame, a roller mounted thereon and adapted to rest by gravity upon the belt and force said teeth into the soil, and means for raising said frame to relieve the pressure on said belt, substantially as described.

4. The combination, with a wheeled frame, of an apron or belt mounted thereon and provided with a series of knives adapted to dig into the soil and cut the roots of the grass therein, a pivoted frame, a roller carried thereby and adapted to bear on the lower section of the belt and force said teeth into the soil, a second roller also carried by said frame and adapted to engage the upper section of the belt, and mechanism for raising said frame.

5. The combination, with a wheeled frame, of an apron or belt, a series of knives mounted thereon and adapted to dig into the soil, a frame, a roller mounted thereon and adapted to rest by gravity upon said belt and force said knives into the soil, a second roller in substantially the same horizontal plane as said first-named roller and having a vertical movement in its bearing and also adapted to bear upon said belt, substantially as described.

6. The combination, in a machine of the class described, with a toothed apron or belt, of a frame, rollers mounted therein and adapted to rest by gravity upon the lower section of said belt to force its teeth into the soil, and a roller arranged to engage the upper section of said belt and lift the same when the pressure is relieved on said lower section, substantially as described.

7. The combination, with a wheeled frame, of an endless belt or apron thereon, knives mounted at intervals on said belt and adapted to dig into the soil, an oscillating frame, rollers mounted in said frame and adapted to rest by gravity upon the lower section of said belt, one of said rollers having a vertical movement in its bearings, arms 28 carried by said frame, a roller 29 mounted on said arms and arranged to engage the upper section of the belt, and mechanism for raising said frame.

8. In a machine of the class described, an apron or belt composed of sprocket-chains, bars arranged in pairs secured at their ends to said chains, knives mounted on bolts at intervals between the bars of each pair, and pins also mounted between the bars of each pair and alternating in position with said knives, substantially as described.

9. The combination, with a wheeled frame, of a shaft 8 journaled in bearings thereon, a cylinder or drum 7 mounted on said shaft and provided at each end with sprocket-teeth, a roller 13 supported on said frame, a belt composed of sprocket-chains, and bars connecting the same passing around said cylinder and said roller the periphery of said cylinder being near the base-line of the wheels and the surface of the ground, and a series of knives mounted on said belt and adapted to dig into the soil as the machine is moved along, substantially as described.

10. The combination, with a wheeled frame, of a comparatively large cylinder or drum suspended beneath the same and having its periphery near the surface of the ground, a roller carried by said frame in the rear of said drum and of less diameter than said drum, an apron or belt carried by said drum and roller and provided with a series of knives and teeth arranged at intervals and adapted to dig into the surface of the soil, a gravity device provided between said drum and roller and adapted to bear upon the lower section of said belt and force a row of knives and a row of teeth simultaneously into the soil, and means for driving said belt.

11. The combination, with a wheeled frame, of a drum suspended beneath the same and having its periphery near the surface of the ground, a roller carried by said frame in the rear of said drum, an apron arranged to travel over said drum and roller, said apron being provided with alternating transverse rows of knives and teeth or pins, the pins being arranged in the rear of the space between each pair of knives, means arranged to bear upon the lower section of said belt between said drum and roller and force a row of knives and a row of teeth or pins simultaneously into the soil, and means for driving said belt.

12. The combination, with a wheeled frame, of a drum suspended beneath the same, a shaft in the rear of said drum, a toothed belt operating over said drum and shaft, and means interposed between said drum and shaft to engage the lower section of said belt and force said teeth into the soil, substantially as described.

In witness whereof I have hereunto set my hand, this 20th day of September, 1904, at Austin, Minnesota.

MATHIES SCHMITT.

In presence of—
R. E. SHEPHERD,
M. E. JAHNKE.